(12) United States Patent
Kim et al.

(10) Patent No.: US 12,142,994 B2
(45) Date of Patent: Nov. 12, 2024

(54) HOLLOW SHAFT MOTOR

(71) Applicants: BMC CO., LTD., Anseong-si (KR); HL Mando Corporation, Pyeongtaek-si (KR)

(72) Inventors: Ok Yun Kim, Seoul (KR); Kea Ho Lee, Gwangju (KR); Haeng Chul Sin, Gwangju (KR); Gwan Seon Jeong, Gwangju (KR)

(73) Assignees: BMC CO., LTD., Anseong-si (KR); HL Mando Corporation, Pyeongtaek-si (KR)

( * ) Notice: Subject to any disclaimer, the term of this patent is extended or adjusted under 35 U.S.C. 154(b) by 218 days.

(21) Appl. No.: 17/886,511

(22) Filed: Aug. 12, 2022

(65) Prior Publication Data
US 2022/0393547 A1  Dec. 8, 2022

Related U.S. Application Data

(63) Continuation of application No. PCT/KR2021/002901, filed on Mar. 9, 2021.

(30) Foreign Application Priority Data

Apr. 24, 2020 (KR) .......................... 10-2020-0049722

(51) Int. Cl.
| | |
|---|---|
| *H02K 7/102* | (2006.01) |
| *H02K 1/274* | (2022.01) |
| *H02K 3/28* | (2006.01) |
| *H02K 5/04* | (2006.01) |
| *H02K 5/22* | (2006.01) |
| *H02K 7/00* | (2006.01) |

(52) U.S. Cl.
CPC ............. *H02K 7/102* (2013.01); *H02K 1/274* (2013.01); *H02K 3/28* (2013.01); *H02K 5/04* (2013.01); *H02K 5/225* (2013.01); *H02K 7/003* (2013.01)

(58) Field of Classification Search
CPC ............. H02K 1/274; H02K 3/28; H02K 5/04; H02K 5/225; H02K 7/003; H02K 7/102
See application file for complete search history.

(56) References Cited

U.S. PATENT DOCUMENTS

| | | | |
|---|---|---|---|
| 8,878,407 B2 | 11/2014 | Ikura | |
| 2003/0201688 A1* | 10/2003 | Yamamura | ............. H02K 3/522 310/71 |

(Continued)

FOREIGN PATENT DOCUMENTS

| | | |
|---|---|---|
| JP | 2000-65179 A | 3/2000 |
| KR | 10-0491695 B1 | 5/2005 |

(Continued)

OTHER PUBLICATIONS

International Search Report for PCT/KR2021/002901 mailed Jul. 5, 2021 from Korean Intellectual Property Office.

*Primary Examiner* — Jue Zhang
(74) *Attorney, Agent, or Firm* — Revolution IP, PLLC

(57) ABSTRACT

A hollow shaft motor includes: a motor housing 11 having a cylindrical shape; a housing cover assembly 12 coupled to an upper portion of the motor housing 11; a rear cover 15 coupled to a lower portion of the motor housing 11; a stator assembly 20 located in the motor housing 11 and in a lower portion of the housing cover assembly 12; and a rotor assembly 30 located in the stator assembly 20 to rotate.

4 Claims, 8 Drawing Sheets

(56) References Cited

U.S. PATENT DOCUMENTS

2013/0043745 A1 2/2013 Hussain
2018/0348505 A1 12/2018 Sekii
2020/0395809 A1 12/2020 Kim

FOREIGN PATENT DOCUMENTS

| KR | 10-2016-0001681 A | 1/2016 |
| KR | 10-2017-0006535 A | 1/2017 |
| KR | 10-2019-0095748 A | 8/2019 |
| KR | 10-2094085 B1 | 3/2020 |
| WO | 2018-100966 A1 | 6/2018 |

* cited by examiner

【Fig. 1】
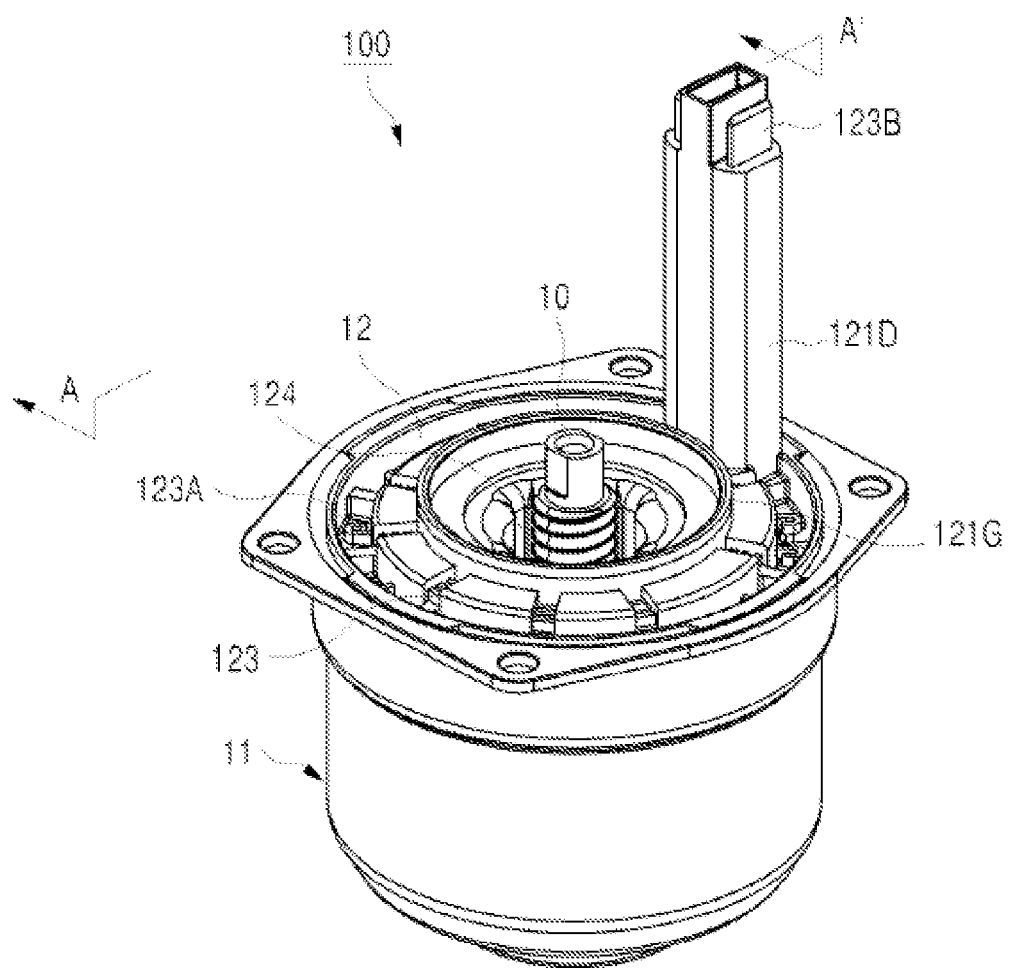

[Fig. 2]
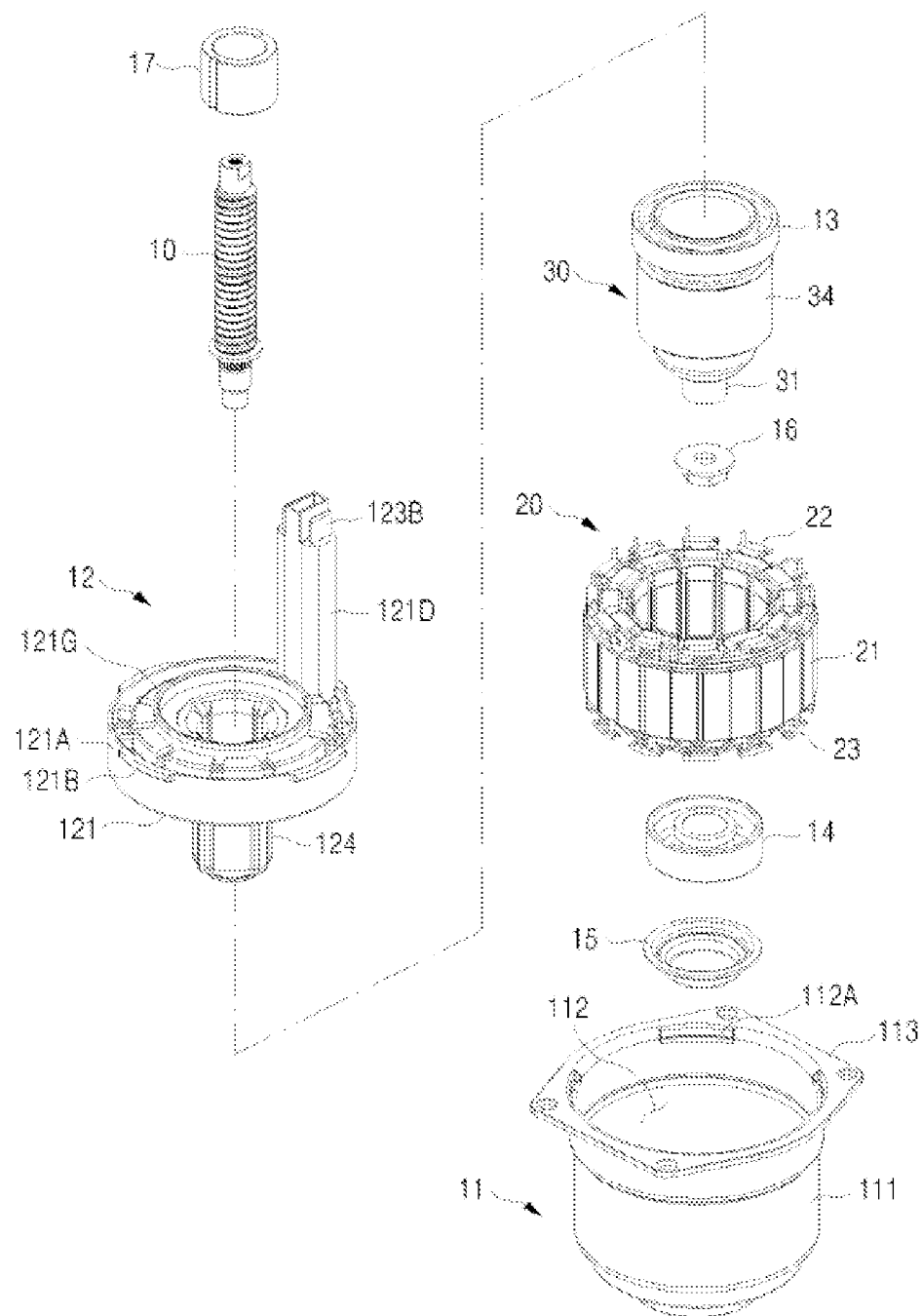

[Fig. 3]
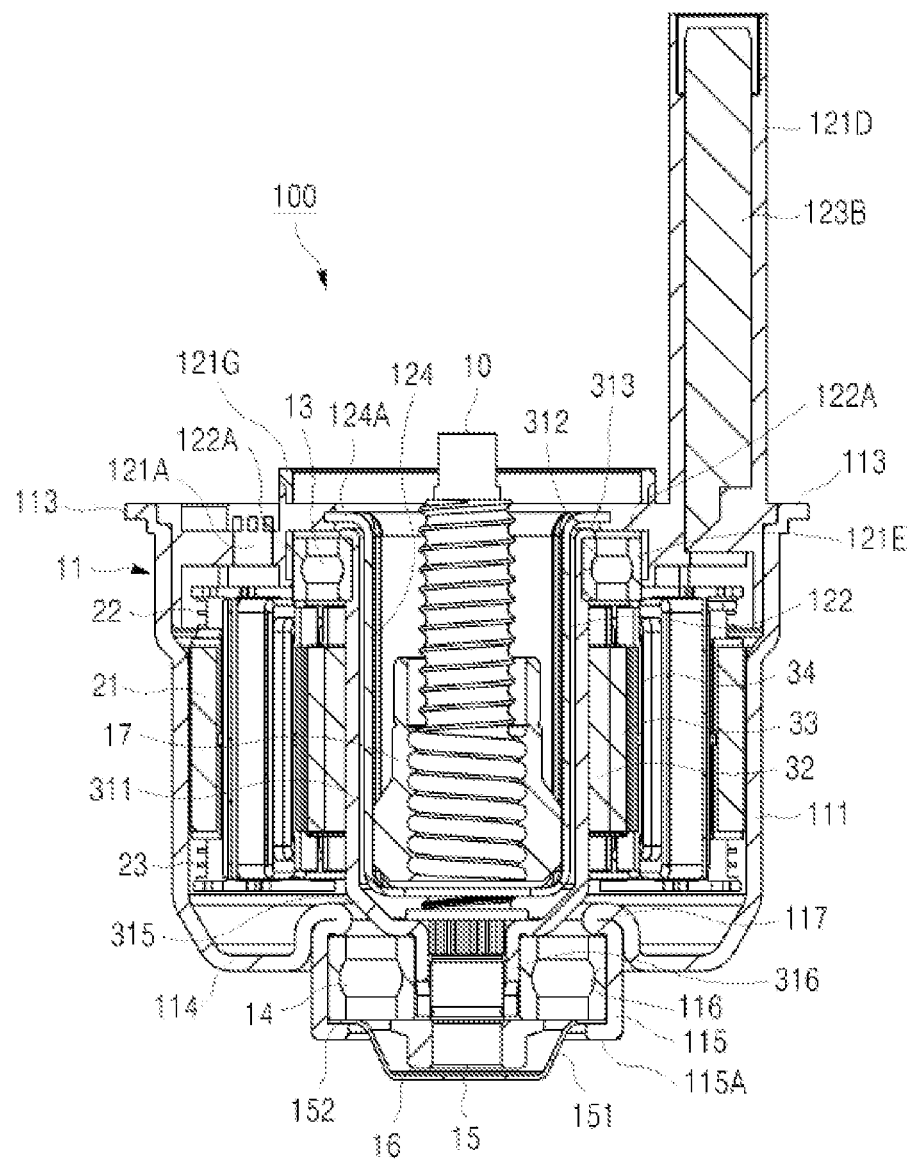

[Fig. 4]
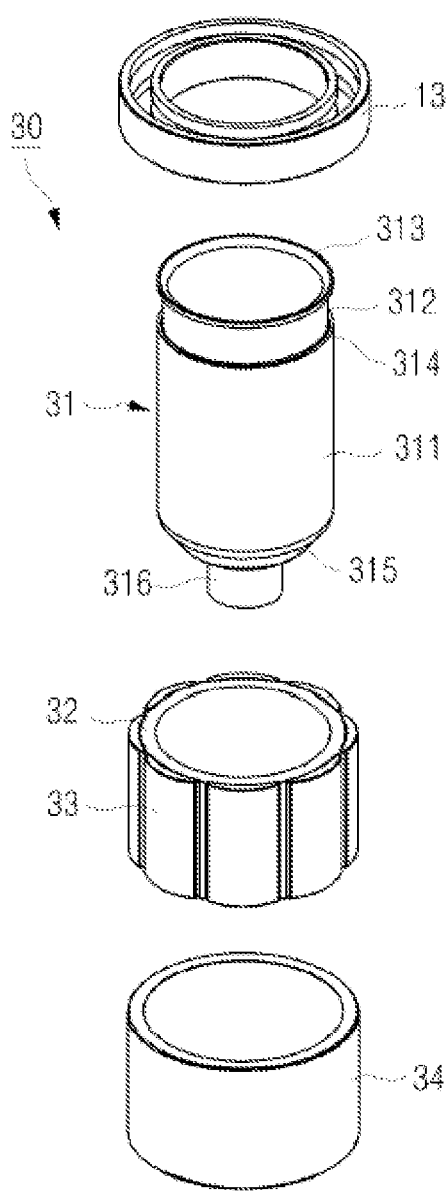

[Fig. 5]
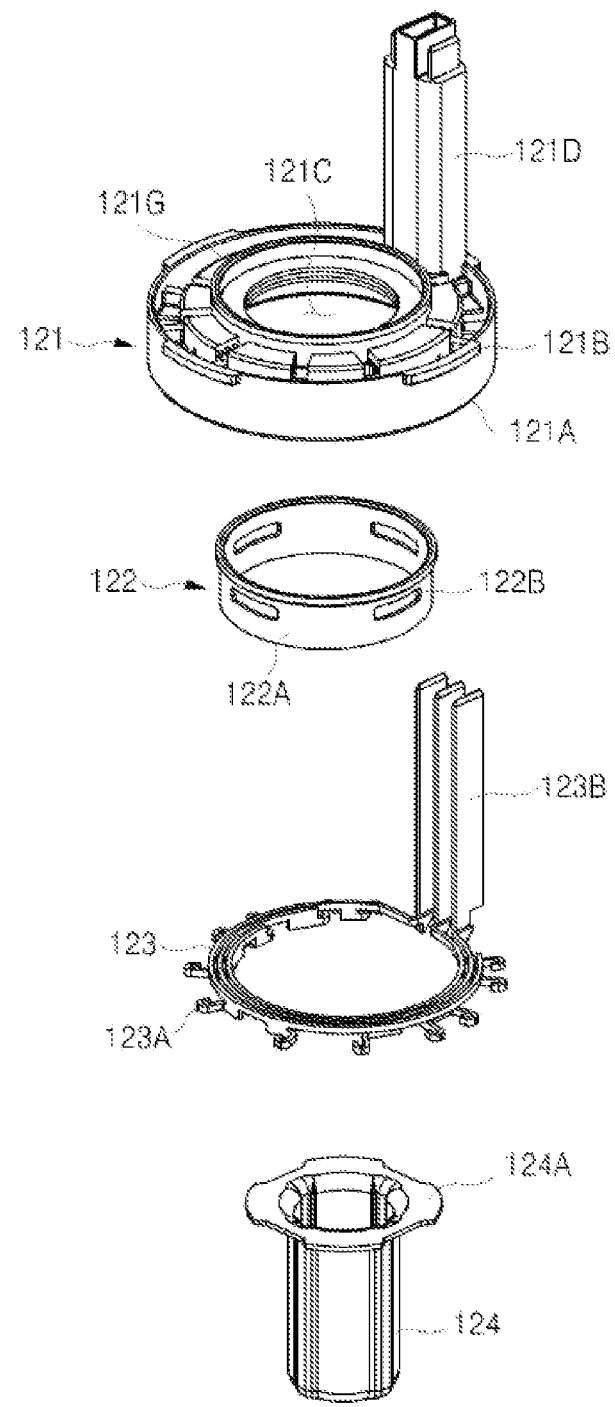

[Fig. 6]
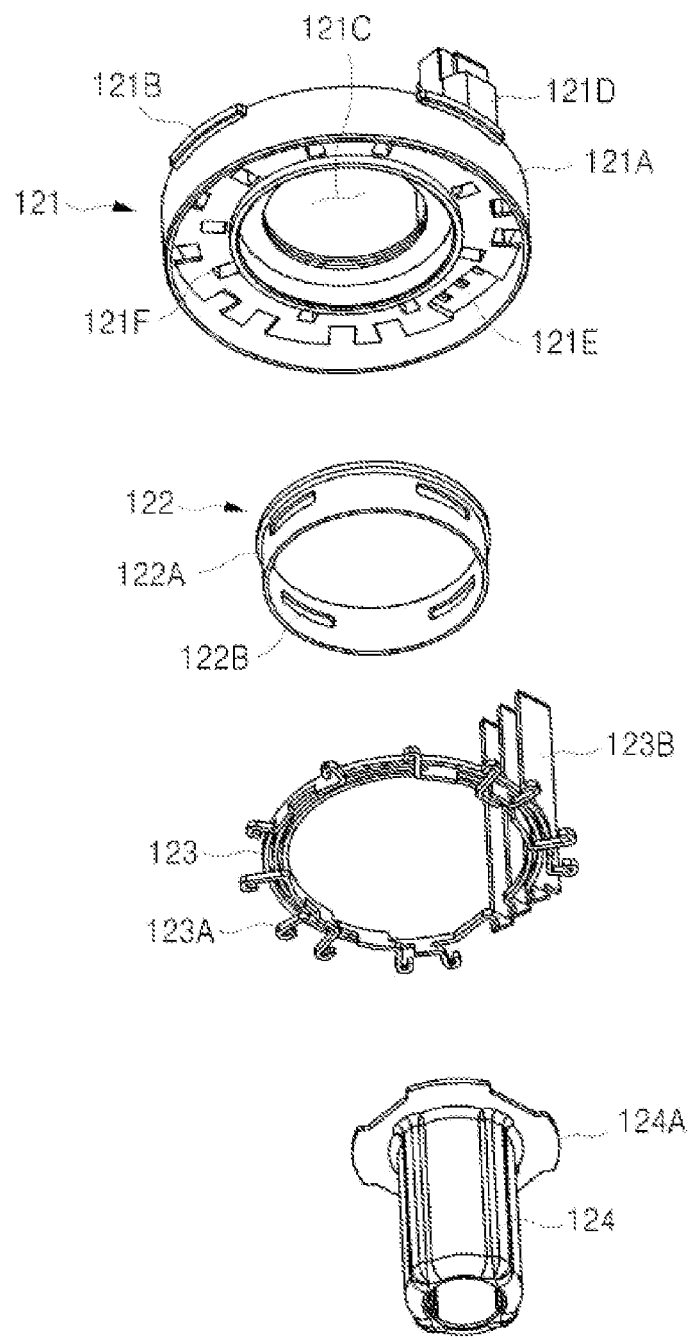

[Fig. 7]
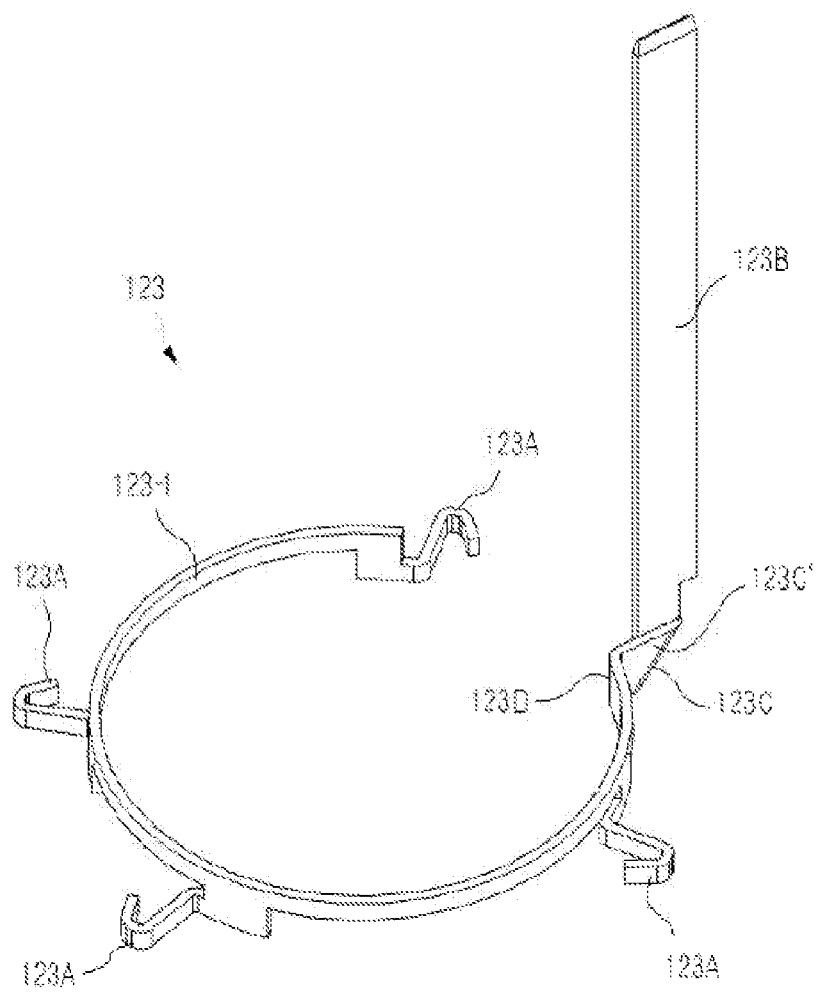

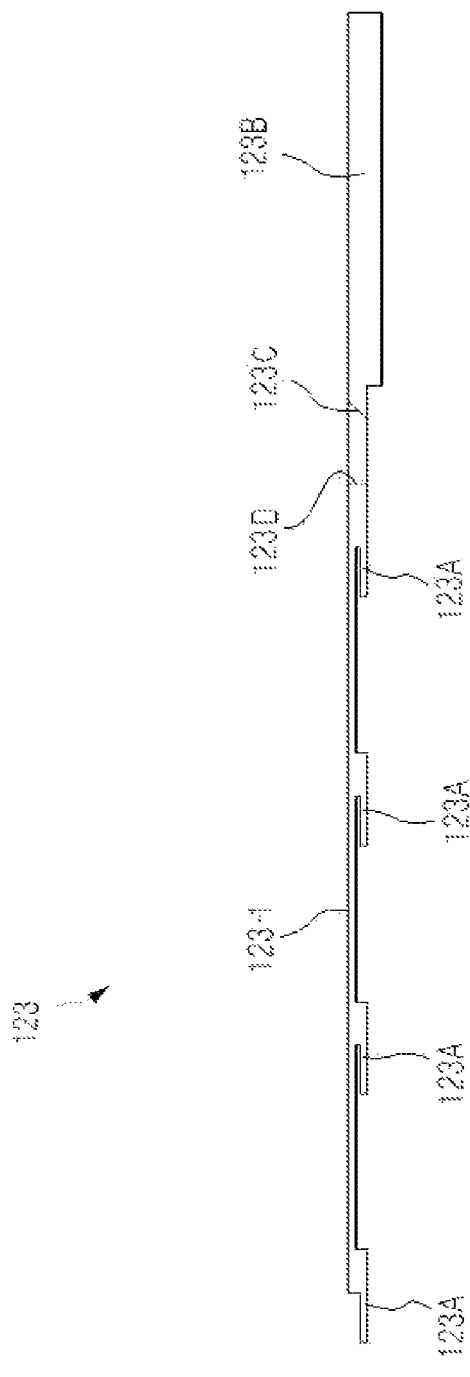
[Fig. 8]

HOLLOW SHAFT MOTOR

TECHNICAL FIELD

The present invention relates to a motor. More specifically, the present invention relates to a motor adopting a bent hollow shaft and a novel structure of housing, housing cover, and a bus bar to a hollow shaft motor used in an integrated brake system, thereby allowing the hollow shaft and motor housing to be produced by a pressing process, reducing manufacturing costs and improving assemblability and productivity.

BACKGROUND ART

In general, a brake system generates pressure in a master cylinder to amplify the force applied to a brake and provides the pressure to a module requiring braking. A hollow shaft motor is used as an apparatus for generating pressure in a master cylinder. Such hollow shaft motor rotates a hollow shaft by the principle of a motor, and applies a screw inside the hollow shaft to use the principle of converting rotary motion into linear motion. The linear motion of the screw actuates a piston to generate or remove the pressure required in the master cylinder.

Recently, an integrated dynamic brake (IDB) system mainly used a motor with a hollow shaft. Since the hollow shaft of the motor needs to generate high pressure by a screw and a piston operating in the hollow shaft, a considerable axial load is imposed on bearings supporting the hollow shaft. In this regard, four-point contact ball bearings may be used to support the rotation of the hollow shaft.

Korean Patent Laid-open No. 10-2016-0001681 discloses a motor having a structure that can manufacture a hollow shaft and a motor housing by a pressing process. Here, however, since the motor housing has the lower side closed, the assembling operation is difficult, and it is difficult to install a four-point contact ball bearing.

Japanese Patent Laid-open No. 2000-65179 discloses a structure of fastening covers to an upper portion and a lower portion of a motor housing, respectively, by means of bolts. This structure increases manufacturing processes, and makes it difficult to maintain the air tightness between the motor housing and the cover.

Korean Patent Laid-open No. 10-2017-0006535 discloses a structure of opening the lower side of a motor housing and assembling a separate cover thereto, and the technique of manufacturing a motor housing by a pressing process such as deep drawing. According to the structure, a separate cover is assembled to the lower side of the motor housing to support bearings supporting a hollow shaft, thereby supporting the load imposed on the hollow shaft. Thus, the assemblability and productivity decrease.

Meanwhile, Korean Patent No. 10-0491695 discloses a structure of coupling, by welding, a connection terminal for connecting an external power source to a bus bar for wiring coils of a motor per phase. In case of coupling a connection terminal to a bus bar by welding as above, there are problems that the reliability of the electric connection decreases due to the contact failure from the welding, manufacturing costs according to the welding increases, and a post-plating process is required even though the bas bar is plated after the welding, thereby increasing plating costs.

U.S. Pat. No. 8,878,407 discloses the features of integrally forming an electric power supply terminal to protrude upwardly of a bus bar, and bending the protruding electric power source terminal and connecting the same to an external electric power supply. However, since the electric power supply terminal protrudes upwardly of the bus bar, in case of punching the bus bar from the base material by a pressing process, the bus bar has an L shape, and thus many straps in the base material are left out.

SUMMARY OF THE INVENTION

Technical Task

The present invention was invented in order to solve the above-mentioned problems. It is an object of the present invention to provide a hollow motor with a novel structure capable of manufacturing a bus bar that has a linear shape, not an L shape, and bending a bus bar terminal so as to protrude upwardly of the bus bar.

It is another object of the present invention to provide a hollow shaft motor with a novel structure allowing a hollow shaft and a motor housing to be produced by a pressing process, thereby reducing manufacturing costs, and improving assemblability and productivity.

It is yet another object of the present invention to provide a hollow motor with a novel structure allowing the bearing to be coupled more stably and arranging a central position more accurately when coupled to a brake system by applying a new structure of a housing cover.

The object above and other objects inferred therein can be easily achieved by the present invention explained below.

Means for Solving Technical Task

The hollow shaft motor according to the present invention comprises: a motor housing 11 having a cylindrical shape; a housing cover assembly 12 coupled to an upper portion of the motor housing 11; a rear cover 15 coupled to a lower portion of the motor housing 11; a stator assembly 20 located in the motor housing 11 and in a lower portion of the housing cover assembly 12; and a rotor assembly 30 located in the stator assembly 20 to rotate, wherein the housing cover assembly 12 comprises a housing cover 121 with a bus bar 123, and the bus bar 123 comprises: a bus bar main body 123-1 which is bent in circle; a plurality of coil coupling parts 123A which are formed in the bus bar main body 123-1 and bent to be electrically connected to coils; a bus bar terminal 123B which is formed in one end of the bus bar main body 123-1 to be electrically connected to an external power source; and a first bending part 123C which is bent to protrude the bus bar terminal 123B upwardly of the bus bar 123.

In the present invention, a second bending part 123D which is bent to locate the bus bar terminal 123B on an outer side of the circle of the bus bar main body 123-1 may be formed in the bus bar main body 123-1.

In the present invention, preferably, the housing cover 121 is formed by insert injection molding while placing a press ring 122, a bus bar 123 and a sleeve 124 in a mold.

In the present invention, preferably, the sleeve 124 may have a cylindrical shape vertically penetrated, and a flange 124A radially extended may be formed in an upper portion of the sleeve 124.

In the present invention, preferably, the press ring 122 comprises a press ring main body 122A and a plurality of fastening holes 122B formed to penetrate a side of the press ring main body 122A.

Effect of the Invention

The present invention allows a hollow shaft of a motor and a motor housing to be produced by a pressing process, thereby having the effects of providing a hollow shaft motor with a novel structure capable of reducing manufacturing costs, improving assemblability and productivity, and arranging a central position more accurately when coupled to a brake system.

BRIEF DESCRIPTION OF THE DRAWINGS

FIG. 1 is a perspective view of a hollow shaft motor according to the present invention;

FIG. 2 is an exploded perspective view of the hollow shaft motor according to the present invention;

FIG. 3 is a cross-sectional view taken along the A-A' direction of FIG. 1;

FIG. 4 is an exploded perspective view of a rotor assembly of the hollow shaft motor according to the present invention;

FIG. 5 is an exploded top perspective view of a housing cover assembly of the hollow shaft motor according to the present invention;

FIG. 6 is an exploded bottom perspective view of a housing cover assembly of the hollow shaft motor according to the present invention;

FIG. 7 is a perspective view of a bus bar of the hollow shaft motor according to the present invention; and FIG. 8 is a spread perspective view of a bus bar of the hollow shaft motor according to the present invention.

Hereinafter, the present invention will be explained in detail with reference to the accompanying drawings.

Detailed Description for Carrying Out the Invention

FIG. 1 is a perspective view of a hollow shaft motor 100 according to the present invention, FIG. 2 is an exploded perspective view of the hollow shaft motor 100 according to the present invention, and FIG. 3 is a cross-sectional view taken along the A-A' direction of FIG. 1.

As illustrated in FIGS. 1 to 3, the hollow shaft motor 100 according to the present invention includes a screw shaft 10, a motor housing 11, a stator assembly 20 coupled to an inner side of the motor housing 11, and a rotor assembly 30 located in the stator assembly 20.

The screw shaft 10 has a lower end portion coupled to the hollow shaft 31 so as to rotate with the rotor assembly 30. A ball nut 17 is coupled to an outer circumferential surface of the screw shaft 10, and the ball nut 17 moves up and down according to the rotation of the screw shaft 10, thereby generating or removing the pressure in the piston (not illustrated).

The motor housing 11 can be manufactured by a continuous process using pressing equipment such as a transfer mold. The motor housing 11 has a body part 111 having a cylindrical shape whose upper portion and lower portion are open. The part that is open to the upper side of the motor housing 11 is an inner space part 112, and a flange part 113 extending in the horizontal direction is formed around the upper portion of the inner space part. A housing cover assembly 12 is coupled to the inner space part 112 so as to cover an upper portion of the inner space part 112. A flange part 113 is coupled to a block (not illustrated) of a brake system.

A bottom part 114 horizontally extending towards the center is formed in a lower portion of the body part 111, and the lower end portion of the body part 111 may have a horizontal cross-section diameter reducing until reaching the bottom part 114. A lower protruding part 115 protruding downwardly is formed in a central portion of the bottom part 114. A lower bearing coupling part 116 to which the lower bearing 14 is coupled is formed in a space inside the lower protruding part 115. A curved bent part 117 in which the bottom part 114 and the lower protruding part 115 are connected is formed in an upper end portion of the lower bearing coupling part 116. In other words, the curved bent part 117 has a shape where a central portion of the bottom part 114 is bent so as to be connected to the lower protruding part 115, which allows the curved bent part 117 to support the upper circumferential surface of the lower bearing 14 so that the lower bearing 14 could be coupled more solidly and intensively.

The curved bent part 117 has a structure wherein the material is bent and folded, to reinforce strength. Thus, when a great load is imposed on a lower bearing 14, the structure can help supporting the load. The lower bearing 14 is press-fitted and coupled to an inner surface of the lower protruding part 115, and the upper circumferential portion of lower bearing 14 is supported by the curved bent part 117. The curved bent part 117 is preferably bent and extended to the inside at a position the same as or higher than the bottom part 114, thereby stably supporting the lower bearing 14.

The lower circumferential portion of the lower bearing 14 is supported by a curling part 115A. As illustrated in FIG. 3, the flange part 152 of the rear cover 15 may be interposed between the curling part 115A and the lower circumferential portion of the lower bearing 14. The curling part 115A is formed by subjecting a lower distal portion of the lower protruding part 115 to a curling process by the press.

The housing cover assembly 12 comprises a housing cover 121 produced by a plastic mold, and the housing cover 121, preferably, is made of a plastic mold to be formed by insert injection molding while placing a press ring 122, a bus bar 123 and a sleeve 124 in a mold. Accordingly, the housing cover assembly 12 becomes a member in which the housing cover 121, the press ring 122, the bus bar 123 and the sleeve 124 are integrally formed.

The housing cover 121 comprises a circular cover main body 121A with a penetrating hole in the middle, a plurality of fitting protrusions 121B formed to radially protrude in the outer circumferential surface of the cover main body 121A, a cavity 121C which is a hole formed to penetrate the center of the cover main body 121A, and a terminal cover 121D formed by protruding upwardly at one upper side of the cover main body 121A. A fitting groove 112A is formed around an upper portion of the inner space part 112 of the motor housing 11 corresponding to the fitting protrusion 121B so that the fitting protrusion 121B is fitted into and coupled to the fitting groove 112A. The terminal cover 121D comprises a bus bar terminal 123B thereinside, allowing the bus bar terminal 123B to be connected to an external power source. A ball nut 17 and a piston (not illustrated) for moving up and down by the rotation of the hollow shaft 31 and the screw shaft 10 are located inside the sleeve 124.

The outer race of the upper bearing 13 is press-fitted and supportedly coupled to the inner side of the press ring 122 which is coupled to the circumference of the cavity 121C of the housing cover 121. The inner race of the upper bearing 13 is supported by an upper bearing coupling groove 312 formed in the upper portion of the hollow shaft 31 to support the rotation of the hollow shaft 31. The sleeve 124 is downwardly extended from an inner space of the hollow shaft 31, allowing the hollow shaft 31 to be independently separated from the inner space of the sleeve 124. Accordingly, a movement space of the piston (not illustrated) which moves up and down may be independently secured.

The lower bearing 14 supports the rotation of a lower bearing supporting part 316 formed in a lower end portion of the hollow shaft 31. The lower bearing 14 is coupled to the lower bearing coupling part 116 formed in a lower end of the motor housing 11.

As illustrated in FIG. 3, the rear cover 15 is coupled to a lower inner side of the lower protruding part 115 of the motor housing 11 to cover the lower portion of the lower protruding part 115. The rear cover 15 is coupled and fixed to the lower protruding part 115 by a curling part 115A at a lower end of the lower protruding part 115. A lock nut 16 is coupled to a lower end of the screw shaft 10.

The stator assembly 20 comprises a stator core 21 press-fitted and fixed to an inner side of the body part 111 of the motor housing 11, an upper insulator 22 coupled to an upper portion of the stator core 21, and a lower insulator 23 coupled to a lower portion of the stator core 21. A coil (not illustrated) is wound around each insulator, and the coil is electrically connected to a bus bar 123 of the housing cover assembly 12 coupled to an upper portion of the upper insulator 22. The bus bar 123 is electrically connected to an external power source through a bus bar terminal 123B. The bus bar terminal 123B is surrounded and protected by a terminal cover 121D.

The outer circumferential portion of the housing cover 121 is press-fitted and coupled to an upper portion of the inner space part 112 formed in the upper inner side of the body part 111 of the motor housing 11. Detailed features of the housing cover 121 will be explained again with reference to FIGS. 5 and 6 in the following.

FIG. 4 is an exploded perspective view of a rotor assembly 30 of the hollow shaft motor 100 according to the present invention. Referring to FIGS. 3 and 4 together, the rotor assembly 30 of the present invention is located inside the stator assembly 20 to rotate. To this end, the rotor assembly 30 comprises a hollow shaft 31, a rotor core 32 coupled to the outer circumference of the hollow shaft 31, a plurality of magnets 33 attached to an outer circumference of the rotor core 32, and a rotor can 34 coupled to an outer circumferential portion of the magnet 33.

The hollow shaft 31 has a hollow shaft housing 311 having a cylindrical shape. The rotor core 32 is coupled to an outer circumferential surface of the hollow shaft housing 311. A plurality of magnets 33 are attached to an outer circumferential surface of the rotor core 32. As needed, the rotor core 32 may be omitted, and the plurality of magnets 33 may be directly attached to the outer circumferential surface of the hollow shaft housing 311. The rotor 34 is press-fitted and coupled to the outer circumferential surface of the magnet 33.

An upper bearing coupling groove 312 having a slightly smaller diameter than the hollow shaft housing 311 is formed in an upper portion of the hollow shaft housing 311. The rotation of the inner race of the upper bearing 13 is supported by the upper bearing coupling groove 312. An upper stepped part 313 bent outwardly is formed at an upper portion of the upper bearing coupling groove 312, and a lower stepped part 314 is formed at a lower portion of the upper bearing coupling groove 312, so as to have a groove shape for coupling the inner race of the upper bearing 13 to the upper bearing coupling groove 312. The upper stepped part 313 may be formed by a curling process during the press molding process.

A reduced diameter part 315 which is a part bent and connected so that the diameter thereof is gradually reduced to the diameter of the lower bearing supporting part 316 is formed at a lower end portion of the hollow shaft housing 311. The rotation of the lower bearing supporting part 316 protruding from the reduced diameter part 315 is supported by the lower bearing 14.

FIG. 5 is an exploded top perspective view of a housing cover assembly 12 of the hollow shaft motor 100 according to the present invention, and FIG. 6 is an exploded bottom perspective view thereof.

Referring to FIGS. 5 and 6 together with FIG. 3, the housing cover assembly 12 of the present invention comprises a housing cover 121, a press ring 122, a bus bar 123 and a sleeve 124. As mentioned in the above, since the housing cover 121 is molded by insert injection together with the press ring 122, the bus bar 123 and the sleeve 124, it is not possible to provide an exploded view as illustrated in FIGS. 5 and 6, but here, an exploded view thereof is provided for the sake of convenience in explanation.

The housing cover 121 comprises a cover main body 121A, a fitting protrusion 121B, a cavity 121C and a terminal cover 121D, and a settlement space 121E, which is where the press ring 122 is coupled and which becomes an inner side surface of the cover main body 121A, is formed. A coil connecting part 121F has a plurality of holes towards a lower side of the cover main body 121A, and a coil coupling part 123A of the bus bar 123 is located inside the coil connecting part 121F. A coil (not illustrated) wound around the stator assembly 20 is electrically connected to the coil coupling part 123A. This connection between the coil and coil coupling part 123A is made in the coil connecting part 121F.

A ring-shaped protruding ring 121G protruding upwardly is formed around a cavity 121C at the upper portion of the housing cover 121. When the hollow shaft motor 100 according to the present invention is installed in a brake system (not illustrated), the protruding ring 121G helps the hollow shaft motor to be installed at an exact position, and helps the screw shaft 10 to be coupled to the brake system maintaining its exact center.

The press ring 122 is made of metal so that the upper bearing 13 can be firmly coupled, and the press ring 122 is coupled to the housing cover 121 as one part by insert injection. The press ring 122 comprises a press ring main body 122A and a plurality of fastening holes 122B formed to penetrate a side of the press ring main body 122A. The outer race of the upper bearing 13 is coupled to an inner side surface of the press ring main body 122A. The fastening hole 122B allows a resin melted product to penetrate therethrough so that the press ring 122 is well coupled to the housing cover 121.

The bus bar 123 is made of a conductive material so that coils on the same phase are electrically connected to each other to receive an external power source. The bus bar 123 comprises a plurality of coil coupling parts 123A formed to radially protrude from the ring shape, and a bus bar terminal 123B for connecting to the external power source. The housing cover 121 is injection molded in a state where the bus bar 123 is located inside the housing cover 121 except for some parts of the coil coupling part 123A and the bus bar terminal 123B. The detailed description of the bus bar will be explained again with reference to FIGS. 7 and 8.

The sleeve 124 has a cylindrical shape vertically penetrated, and a flange 124A radially extended is formed in an upper portion of the sleeve 124. The flange 124A is located in the upper portion of the cavity 121C of the housing cover 121, and the flange 124A is surrounded by a plastic resin forming the housing cover 121. A screw shaft 10 for moving the piston (not illustrated) up and down and a ball but 17 are located in the inner space of the sleeve 124.

FIG. 7 is a perspective view of a bus bar of the hollow shaft motor according to the present invention, and FIG. 8 is a spread perspective view of a bus bar of the hollow shaft motor according to the present invention. Referring to FIGS. 7 and 8 together, the bus bar 123 of the present invention comprises a bus bar main body 123-1 which is bent in a circle, a plurality of coil coupling parts 123A which are formed in the bus bar main body 123-1 and bent to be electrically connected to coils, a bus bar terminal 123B which is formed in one end of the bus bar main body 123-1 to be electrically connected to an external power source, a first bending part 123C which is bent to protrude the bus bar terminal 123B upwardly of the bus bar 123, and a second bending part 123D which is bent to locate the bus bar terminal 123B on an outer side of the circle of the bus bar main body 123-1. In FIGS. 5 and 6, three bus bars 123 are illustrated. In the case of a three-phase brushless motor, three bus bars 123 wire the three phases of U, V, and W, respectively. Additionally, since the motor has twelve slots in which the coils are wound, a total of twelve coil coupling parts, four coil coupling parts each, are formed in each phase. The numbers of bus bars 123 or coil coupling parts 123A may vary depending on the types or specifications of the motor.

The bus bar 123 is manufactured by punching using a pressing process with thin steel plates such as flat rolled magnetic steel sheets and strips as base material. Therefore, more bus bars 123 can be manufactured in the base material of the same area when the bus bar 123 has a linear shape than when the bus bar 123 has an L-shape. Accordingly, in the present invention, the linear bus bar 123 in FIG. 8 is bent and thus is manufactured to have the shape as illustrated in FIG. 7. The bus bar terminal 123B bends the first bending part 123C formed in the diagonal direction of the bus bar main body 123-1 so as to protrude upwardly of the bus bar main body 123-1. In this case, an overlapped portion 123C' in which materials are overlapped is formed in the bent portion of the first bending part 123C.

By such structure, the amount of straps left out when manufacturing the bus bar 123 can be reduced. Additionally, in case of plating the surface of the bus bar 123 with conductive metals, more bus bars can be plated, and thus productivity and manufacturing costs can be reduced.

The detailed description of the present invention described as above simply explains examples for understanding the present invention, but does not intend to limit the scope of the present invention. The scope of the present invention is defined by the accompanying claims. Additionally, it should be construed that simple modifications or changes of the present invention fall within the scope of the present invention.

What is claimed is:

1. A hollow shaft motor, comprising:
    a motor housing 11 having a cylindrical shape;
    a housing cover assembly 12 coupled to an upper portion of the motor housing 11;
    a rear cover 15 coupled to a lower portion of the motor housing 11;
    a stator assembly 20 located in the motor housing 11 and in a lower portion of the housing cover assembly 12; and
    a rotor assembly 30 located in the stator assembly 20 to rotate,
    wherein the housing cover assembly 12 comprises a housing cover 121 with a bus bar 123, and the bus bar 123 comprises:
    a bus bar main body 123-1 which is bent in a circle;
    a plurality of coil coupling parts 123A which are formed in the bus bar main body 123-1 and bent to be electrically connected to coils;
    a bus bar terminal 123B which is formed in one end of the bus bar main body 123-1 to be electrically connected to an external power source; and
    a first bending part 123C which is bent to protrude the bus bar terminal 123B upwardly of the bus bar 123,
    wherein the housing cover 121 is formed by insert injection molding while placing a press ring 122, a bus bar 123 and a sleeve 124 in a mold.

2. The hollow shaft motor of claim 1, wherein a second bending part 123D which is bent to locate the bus bar terminal 123B on an outer side of the circle of the bus bar main body 123-1 is formed in the bus bar main body 123-1.

3. The hollow shaft motor of claim 1, wherein the sleeve 124 has a cylindrical shape vertically penetrated, and a flange 124A radially extended is formed in an upper portion of the sleeve 124.

4. The hollow shaft motor of claim 1, wherein the press ring 122 comprises a press ring main body 122A and a plurality of fastening holes 122B formed to penetrate a side of the press ring main body 122A.

* * * * *